United States Patent Office 3,725,172
Patented Apr. 3, 1973

3,725,172
METHOD FOR PRODUCING LAMINATES
Frank Fekete, Monroeville, Leonard J. Pulman, Pittsburgh, and David J. Thrash, Ruffsdale, Pa., assignors to Koppers Company, Inc.
Continuation of abandoned application Ser. No. 868,094, Oct. 21, 1969. This application Oct. 27, 1971, Ser. No. 193,225
Int. Cl. B32b 31/00; B29c 19/00
U.S. Cl. 156—252      4 Claims

ABSTRACT OF THE DISCLOSURE

The method for producing continuous lengths of laminates includes forming a plurality of apertures in a substrate and inserting heat curable plastic material in the apertures; thereafter, laminae of heat curable plastic material are applied to opposite surfaces of the substrate and in contact with the plastic material in the apertures. The formed laminate is moved into a press where heat and pressure are applied to cure the plastic material, and then a cut off saw severs the continuous length of laminate into discrete lengths.

This is a continuation of application Ser. No. 868,094, filed Oct. 21, 1969, now abandoned.

BACKGROUND OF THE INVENTION

The present invention relates to laminates and, more particularly, to a method for forming plastic coated laminates with preferably a plywood or non-plastic core.

In some industrial applications, a smooth plastic surface on a plywood or other non-plastic substrate is very desirable and useful structurally as well as decoratively. Heretofore, such plastic laminates have been made individually by covering a surface of a sheet of plywood substrate with a sheet of plastic to which a suitable adhesive had been applied. Thereafter, the formed laminar structure was subjected to pressure to produce a plastic coated laminate.

Those skilled in the art recognize that such a procedure is costly both in time and materials wasted and that the formation of individual laminates in this manner is not efficient. Those skilled in the art will recognize, however, from the following description of one embodiment of the present invention that the method of the invention is effective to produce continuous lengths of plastic covered laminates in an efficient manner.

SUMMARY OF THE INVENTION

The method for producing a laminate in accordance with the invention comprises the steps of making a plurality of apertures in a substrate and inserting heat curable polyester plug material into the apertures. Thereafter, laminae are applied to opposite surfaces of the substrate and the laminar structure is subjected to heat and pressure to cure both the polyester plug material and the polyester lamina material to effect bonding of the laminae to the plug material and to the substrate.

For a further understanding of the invention and for features and advantages thereof reference may be made to the following description in conjunction with the drawing which shows for the purpose of exemplification an apparatus suitable for carrying into practice the method of the invention.

DETAILED DESCRIPTION

Figure 2:
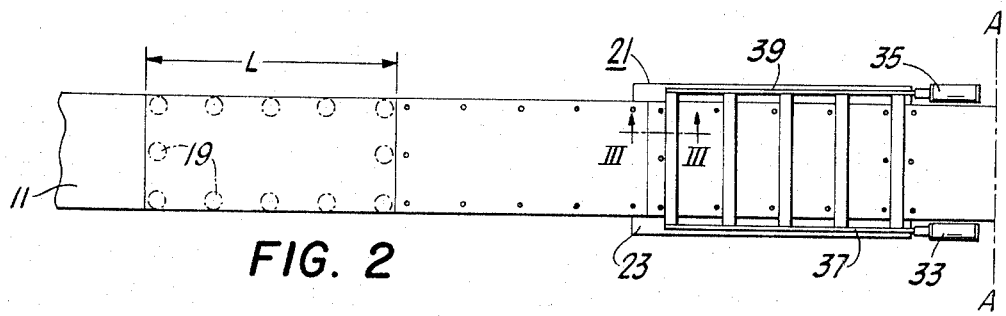
FIG. 2 is a plan view of a portion of the apparatus of FIG. 1.
Figure 1A:
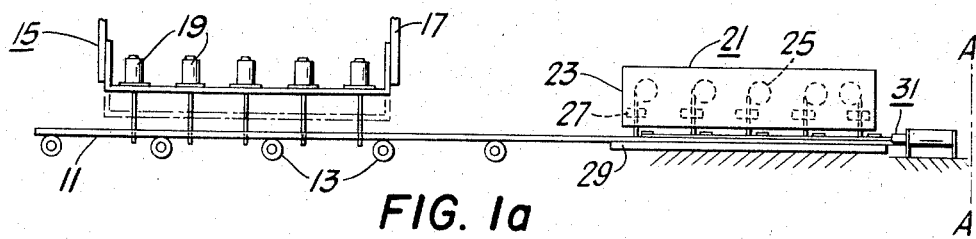
FIGS. 1a and 1b are schematic illustrations taken together of an apparatus capable of carrying into practice the method of the invention.
Figure 3:
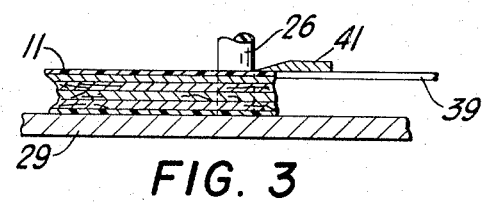
FIG. 3 is a sectional view along line III—III of FIG. 2.

Referring to FIG. 1a, a substrate 11, which may be a continuous length of plywood that is made from individual pieces of plywood that are edge joined together or only edge abutted, is supported on a series of spaced apart rollers 13. The substrate 11 passes a gang-driller 15 having a vertically movable frame 17 to which are secured a plurality of motorized drills 19.

The substrate 11 stops beneath the gang-driller 15 long enough to allow the frame 17 carrying the motorized drills 19 to be lowered and the drill motors to be actuated to produce holes through the substrate 11. The frame 17 and motors may be raised and lowered manually or electrically and the motors of the drills may be actuated in response to a limit switch or in any other suitable manner.

Adjacent the gang-driller 15 is a plug-inserter device 21, which comprises a frame 23 that is stationary with respect to the movable substrate 11. The frame 23 carries a plurality of spools 25 of heat curable polyester plug material 26, and a plug-feeder mechanism 27 is associated with each spool 25. A back-up plate 29 is located beneath and in support of the substrate 11, about where shown in FIG. 1a.

The plug-inserter device 21 also includes a plug-trimmer 31, that is comprised of a pair of fluid actuated pistons 33, 35 having outwardly extending elongate piston rods 37, 39. A plurality of transversely extending knives 41 are mounted to the rods in spaced apart relation, and the knives 41 are disposed in sliding contact with the top surface of the substrate 11. Thus, the plug material 26 after being inserted in the holes in the substrate is trimmed flush with the top surface of the substrate 11 by the knives 41.

Figure 1B:
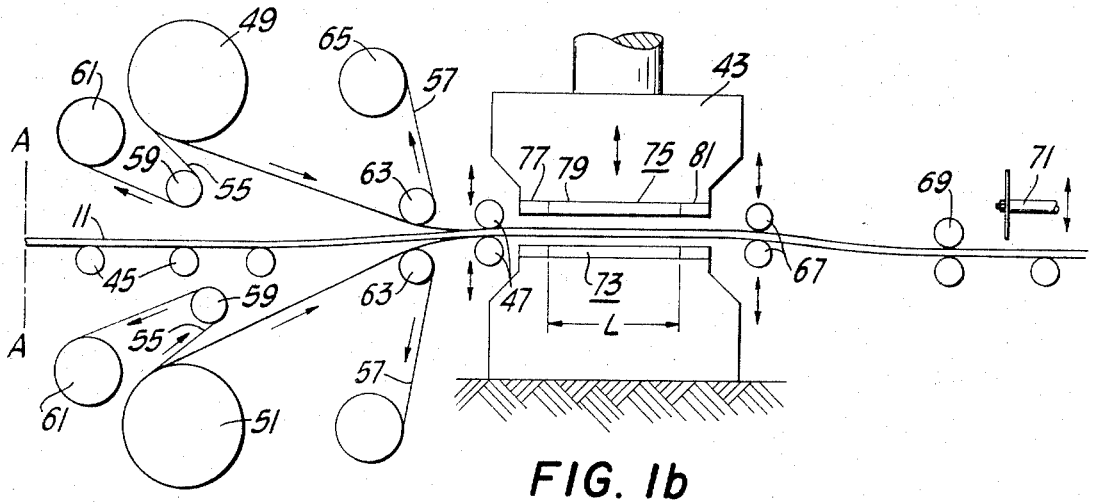

From the line A—A of FIG. 1a, the substrate 11 continues at line A—A of FIG. 1b. The substrate 11, which has been drilled and plugged, now approaches a press mechanism 43. Before the substrate 11 reaches the press mechanism 43, however, it passes over supporting rollers 45 and passes beneath a vertically movable pair of rollers 47.

At the left hand side of FIG. 1b, there is shown a schematic arrangement of two supply rolls 49, 51 carrying continuous lengths of sheet molding compound 53 like the polyester laminate described in co-pending application Ser. No. 798,951, filed Feb. 13, 1969.

The sheet molding compound on each roll 49, 51 is covered on opposite sides with polyethylene film material 55, 57 to prevent adherence of the sheet molding compound 53 to itself. The polyethylene protected sheet molding compound 53 leads from the supply rolls 49, 51 as shown, and immediately the polyester film 55 is removed from one surface of the sheet molding compound 53. The removed film 55 passes over an idler roller 59 and onto a powered take up roller 61. The sheet molding compound moves along toward a pair of spaced apart idler rollers 63 and, after passing these rollers, the other polyester film 57 is removed. The film 57 winds upon a powered take up roller 65.

The lengths of polyester laminate sheet molding compound 53 then contact the opposite sides of the substrate 11 as it passes between rollers 47. The rollers 47 may be coated with a suitable synthetic resin polymer such as that sold and marketed under the trademark Teflon, or the rollers 47 may be spray coated with a dispersion of a synthetic resin polymer such as Teflon.

Another pair of vertically movable rollers 67 are located to the right of the press 43, and further, beyond the rollers 67, is a pair of fixed spaced apart rollers 69, between which the laminate passes. The laminate at this point is ready to be cut into discrete lengths by a suitable mechanism such as a movable rotary saw 71.

In operation, a plurality of sheets of plywood as a substrate 11 are end abutted, or they may be suitably end connected by adhesive or suitable fasteners and the formed substrate moves first to the gang-driller where a finite length L, of the substrate is pierced by a plurality of strategically located drills. Thereafter, the substrate moves on the support rollers a distance L and another plurality of holes are drilled in the substrate by the gang-driller.

When the predrilled substrate reaches and stops at the plug inserter, it operates either manually or automatically so that the holes in the substrate are filled with the polyester plug material.

Thereafter, the plug cutter or trimmer is operated, and the knives sever the plug material flush with the top surface of the substrate.

The substrate continues to move incrementally and as each incremental length L, of substrate moves toward the press, the rollers raise the substrate from the bottom platen 73 of the press. While suspended on the rollers 47, the substrate moves toward the right a distance L, as viewed in FIG. 1b.

Before the substrate enters the press region, the top and bottom surface laminae are applied to the substrate in the manner described hereinbefore.

The top platen 75 of the press 43 is movable vertically a distance that will allow the substrate to be raised above the bottom platen and moved laterally from left to right as viewed in FIG. 1b. Both of the platens 73, 75 are divided into three separate sections 77, 79, 81. The section 77 is cooled to prevent preliminary undersirable spreading and adhesion of the sheet molding compound before pressure is applied to it by the press. Section 79 is a heated section that advances the spreading and adhesion of the sheet molding compound under pressure to effect bonding of the sheet molding compound to the substrate. The section 81 is cooled to solidify and harden the sheet molding compound so that it will be in satisfactory condition for cutting into discrete lengths.

Thereafter, the laminate moves incrementally toward the right, as viewed in FIG. 1b, and as each increment advances it is cut off by the saw which is movable vertically as well as laterally.

The temperature of the heated section of the platens may, of course, be controlled in a known manner, and the platen may be heated either electrically, or by passing heated fluid through internal passages of the heated section of the platen. The cooled sections of the platens may carry a cooling fluid internally to maintain these sections at a desired temperature.

In a typical instance, the platens are heated to a temperature in the range of 200–250° F., and the press applies a pressure of about 200 p.s.i. for a period of about 60 seconds to effect a satisfactory bonding of the sheet molding compound to the substrate.

We claim:
1. The method for producing a laminate comprising the steps:
 (a) feeding a series of substrate boards in edge to edge relation edgewise through a plurality of work stations;
 (b) at a first station making a plurality of apertures through the boards;
 (c) at a second station downstream from the first station inserting solid heat curable polyester resin plugs in said apertures with the ends thereof exposed at at least one face of the boards;
 (d) at a third station downstream from the second station applying a preformed solid heat curable polyester resin lamina to at least said one face of the substrate boards, the lamina being applied in the form of a continuous length thereof bridging the board joints;
 (e) at a fourth station downstream from the third station subjecting the boards to heat and pressure to cure the resin of the plugs and lamina and to form a laminate by interbonding the resin of the plugs and lamina and by bonding resin of the plugs and lamina to the substrate boards; and
 (f) severing said laminate into discrete lengths.

2. A method as defined in claim 1 in which the step of inserting plugs in the apertures is effected by inserting into each aperture the end portion of a continuous length of preformed solid heat curable polyester resin element, and severing the inserted end portion thereof in a plane at said one face of the boards.

3. A method as defined in claim 1 in which the feed of the substrate boards is effected stepwise and in which the operations of forming the apertures and inserting plugs in the apertures are effected in finite board lengths at times between the feed steps.

4. A method as defined in claim 3 in which the step of applying the lamina is effected during feed steps.

References Cited
UNITED STATES PATENTS

| | | | |
|---|---|---|---|
| 2,372,617 | 3/1945 | Trew | 156—252 |
| 3,122,465 | 2/1964 | Keller et al. | 156—290 |
| 3,328,218 | 6/1967 | Noyes | 156—293 |

DOUGLAS J. DRUMMOND, Primary Examiner

U.S. Cl. X.R.

156—256, 293